June 28, 1949. A. H. SUHR 2,474,383
WEEDLESS ARTIFICIAL FISH BAIT
Filed Dec. 20, 1948

Inventor
Albert H. Suhr
By Fred Gerlach
Atty

Patented June 28, 1949

2,474,383

UNITED STATES PATENT OFFICE 2,474,383

WEEDLESS ARTIFICIAL FISH BAIT

Albert H. Suhr, Chicago, Ill.

Application December 20, 1948, Serial No. 66,256

6 Claims. (Cl. 43—37)

The present invention relates generally to artificial bait for use in fishing. More particularly the invention relates to that type of artificial fish bait which is adapted, when attached to the trailing end of a fish line by a leader or like instrumentality, to be used in connection with trolling or casting, is not likely to pick up weeds or become snagged on submerged trees or logs, and as its principal parts or components comprises: (1) a minnow-shaped body having a vertical longitudinally extending slot in its central and rear portions; (2) a rod extending slidably through a centrally disposed, longitudinally extending bore in the front portion of the body and embodying at its front end an eye whereby it may be attached to the trailing end of the fish line; (3) a pair of oppositely positioned hooks extending lengthwise of the slot in the body, consisting of forwardly disposed shank parts and rearwardly disposed hook parts, and having the front ends of their shank parts pivotally mounted at the front end of the slot in order that they are capable of swinging laterally back and forth between an inoperative or normal position wherein the hook parts are disposed in the rear end of the slot, and an operative position wherein the hook parts are disposed exteriorly of the slot in the body; (4) mechanism operative automatically when the body is shifted rearwards relatively to the rod as a result of being struck at or contacted by a fish to swing the hooks into their operative position, and when the body is shifted forwards relatively to the rod to swing the hooks inwards into their inoperative or normal position; and (5) spring means for urging the body forwards with respect to the rod in order that the hooks are normally retained in their inoperative position.

One object of the invention is to provide a weedless artificial fish bait of this type which is an improvement upon, and has certain inherent advantages over, previously designed baits of the same general character, and is characterized by simplicity of design, as well as high efficiency and low cost of manufacture.

Another object of the invention is to provide an artificial fish bait of the type under consideration, in which the mechanism for automatically swinging the hooks into and out of their operative position in response to sliding movement of the minnow-shaped body with respect to the rod, comprises a U-shaped frame which is fixedly positioned in the front end of the slot in the body, is arranged so that the cross-piece thereof is at the front, and its side pieces project rearwards, and has holes in the rear ends of its side pieces through which extend the front ends of the shank parts of the hooks, and also comprises a slide block which is secured to the rear end of the rod, fits slidably between the side pieces of the U-shaped frame, and has pivots for the front extremities of the shank parts of the hooks.

A further object of the invention is to provide a weedless artificial fish bait of the type and character last mentioned in which the spring means for urging the body forwards with respect to the rod is in the form of a spiral compression spring which surrounds the rear end of the rod and is interposed between the cross-piece of the U-shaped frame and the front end of the slide block.

A still further object of the invention is to provide an artificial fish bait which is generally of new and improved construction, consists of a small number of parts, and effectively and efficiently fulfills its intended purpose.

Other objects of the invention and the various advantages and characteristics of the present artificial fish bait will be apparent from a consideration of the following detailed description.

The invention consists in the several novel features which are hereinafter set forth and are more particularly defined by the claims at the conclusion hereof.

In the drawing which accompanies and forms a part of this specification or disclosure and in which like numerals of reference denote corresponding parts throughout the several views.

Figure 1:
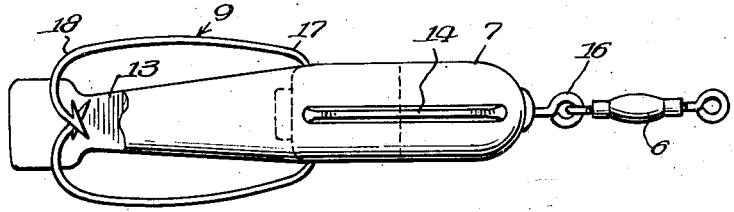
Figure 1 is a side elevation of an artificial fish bait embodying the invention, the rear portion of the body of the bait being broken away for purposes of illustration.
Figure 2:
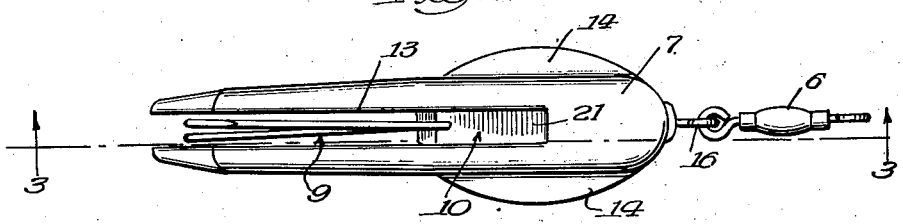
Figure 2 is a plan view of the bait.

The artificial fish bait which is shown in the drawing, constitutes the preferred form or embodiment of the invention. It is adapted to be connected to the trailing end of a fish line (not shown) by a swivel 6 and may be used in casting or trolling operations. As its principal parts or components, the bait comprises a body 7, a rod 8, a pair of hooks 9, a U-shaped frame 10, a slide block 11, and a spring 12.

As hereinafter described in detail, the hooks 9 are so arranged and controlled that the bait as a whole is of the so-called "weedless" variety. In other words, the design and construction of the bait are such that the bait is not likely, in connection with use, to pick up weeds or become snagged on submerged trees, logs, or other objects.

Figure 3:
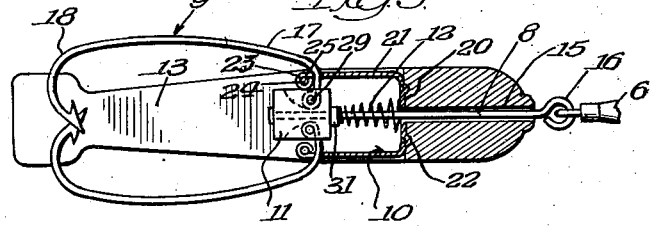
Figure 3 is a vertical, longitudinal section taken on the line 3—3 of Figure 2, and illustrating the hooks in their normal or inoperative position wherein the hook parts thereof are disposed within the rear end of the slot.
Figure 4:
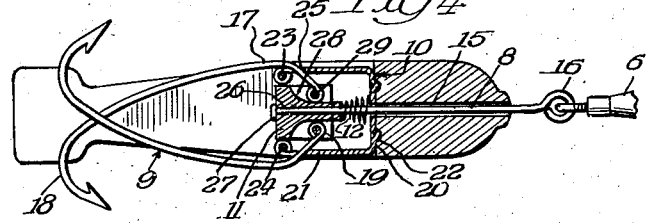
Figure 4 is a similar section showing the hooks swung into their operative position wherein the hook parts thereof are disposed exteriorly of the body.

The body 7 of the bait is formed of wood, molded "plastic" material, or any other suitable rigid substance. It is horizontally elongated and preferably has such a contour or configuration that it resembles a minnow or small fish. The front end of the body is substantially hemispherical and the rear end is vertically elongated so as to resemble a tail or caudal fin. The central and rear portions of the body 7 are provided with a vertical, longitudinally extending slot 13 which, as shown in the drawing, extends completely through the body. At the front portion of the body is a pair of laterally extending fins 14, and these serve to prevent the body from spinning, and also to hold the body in a position wherein the slot 13 extends vertically. The front portion of the body is provided with a centrally disposed, longitudinally extending bore 15, the front end of which extends through the front end of the body, and the rear end of which leads to and communicates with the front end of the vertical, longitudinally extending slot 13. The surface of the front portion of the body that defines the front end of the slot is flat, as best shown in Figures 3 and 4.

The rod 8 extends slidably through the bore 15 in the front portion of the body 7 and formed of such metal and thickness that it possesses the necessary strength and rigidity. The front end of the rod is bent to form an eye 16 which is in interlocked relation with the eye on the rear end of the swivel 6. The rear end of the rod 8 projects an appreciable distance into the front end of the vertical, longitudinally extending slot 13 in the central and rear portions of the body 7. By reason of the fact that the rod 8 extends slidably through the bore 15, the body and rod are capable of relative sliding movement.

The hooks 9 are associated with, and extend lengthwise of, the slot 13 and consist of forwardly disposed shank parts 17 and rearwardly disposed hook parts 18. As shown in the drawing, one of the hooks is disposed adjacent the upper portion of the slot and the other hook is disposed adjacent the lower portion of the slot, and the hook parts 18 are arranged so that when the hooks are in their hereinafter described inoperative or normal position they face one another as shown in Figure 3. The shank parts of the hooks, with the exception of the front ends, are disposed exteriorly of the body when the hooks are in their inoperative position. The front ends of the hooks are bent inwards, extend into the front end of the slot 13, and are provided at their front extremities with eyes 19. As hereinafter described, the hooks by way of the eyes 19 are pivotally mounted so that they are capable of being swung toward one another into position wherein the shank parts 17 cross one another, and the hook parts 18 are disposed exteriorly of the body 7 as shown in Figure 4 of the drawing. The hooks 9 are formed of spring wire and are of the necessary thickness to provide the proper or desired strength.

Figure 5:
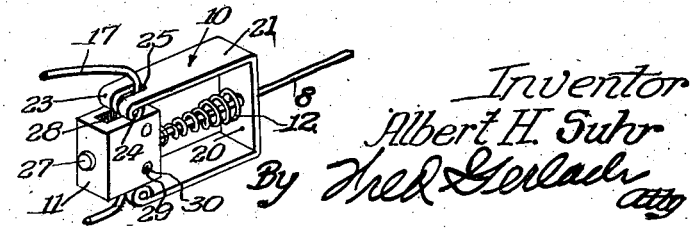
Figure 5 is a perspective of the U-shaped frame and the slide block constituting the mechanism for automatically swinging the hooks into and out of their operative position in response to sliding movement of the body with respect to the rod.

The U-shaped frame 10 is preferably in the form of a stamping of metal and is disposed in the front end of the slot 13. It consists of a vertically extending cross-piece 20 and a pair of side pieces 21. The cross-piece 20 fits flatly against the surface of the body that defines the front end of the slot 13, and embodies forwardly extending protuberances 22 which fit within correspondingly shaped recesses in the aforementioned surface and co-act therewith to hold the frame 10 against vertical displacement with respect to the body 7. The side pieces 21 of the frame 10 are formed integrally with the ends of the cross-piece 20 and project rearwards. They are spaced apart a distance corresponding to a width of the central portion of the body 7 and have the rear ends thereof bent into tubular form to provide inwardly extending sleeves 23. Fulcrum forming pins 24 are fixedly mounted in the sleeves 23. The side pieces 21 of the frame are provided directly forwards of the central portions of the sleeves 23 with holes 25. The front inwardly bent ends of the shank part 17 of the hooks 9 extend through these holes as shown in Figures 3, 4, and 5. These holes open onto the central portions of the pins 24 in order that the bent portions of the shank parts of the hooks bear against and fulcrum on the central portions of the pins. The construction and arrangement of the front ends of the shank parts 17 of the hooks 9 are such that when the eyes 19 are swung rearwards relatively to the U-shaped frame 10, the hooks are swung away from one another into their inoperative or normal position wherein, as previously pointed out, the shank parts are disposed outwards of the slot 13 and the hook parts 18 are disposed within the rear end of the slot as shown in Figure 3, and when the eyes 19 are swung forwards with respect to the frame 10 the hooks are swung towards one another into their operative position wherein the rear ends of the shank parts are in crossed relation and the hook parts 18 are disposed exteriorly of the rear portion of the body.

The slide block 11 is mounted between the sleeves 23 so that the U-shaped frame 10 is slidable forwards and rearwards relatively to it. It is formed of any suitable non-rusting metal such as aluminum, and has in the central portion thereof a horizontal bore 26 which extends lengthwise of the body 7 of the bait. The rear end of the rod 8 extends through the bore 26 and is provided at its extremity with an enlarged head 27. The latter abuts against the rear end surface of the slide block 11 and serves to hold the slide block against rearward displacement with respect to the rod. The upper and lower central portions of the slide block are provided with recesses 28 into which the eyes 19 on the front extremities of the shank parts 17 of the hooks 9 project. The eyes 19 are pivotally connected to the slide block 11 by horizontally extending pivot pins 29. The latter have the ends thereof fixedly mounted in holes 30 in the slide block and are arranged so that the central portions thereof fit within the eyes 19 and extend transversely across the recesses 28. When the body 7 is struck at or contacted by a fish and caused to slide rearwards relatively to the rod 8 and the slide block 11, the U-shaped frame 10 moves rearwards with respect to the slide block with the result that the hooks 9 are caused automatically to swing toward one another into their operative position wherein, as previously pointed out, the hook parts 18 are disposed exteriorly of the body.

The spring 12 is a spiral compression variety spring and serves to urge the body 7 and the frame 10 forwards with respect to the rod 8 to the end that the hooks 9 are normally disposed in their inoperative position as shown in Figure 3. It surrounds the central portion of the rod 8 and is arranged so that the front end thereof abuts against the cross-piece 20 of the U-shaped frame 10 and its rear end abuts against a washer 31. The latter extends around the rod 8 and abuts against the front end of the slide block 11. Forward movement of the body 7 with respect to the rod 8 is limited by the eye 16.

The spiral compression spring 12, as hereinbefore indicated, serves yieldingly to hold the body 7 of the bait in a forward position with respect to the rod 8, to the end that the hooks 9 assume their inoperative position wherein the hook parts 18 are disposed within the rear end of the slot 13, and hence, in connection with use of the bait, do not pick up weeds or become snagged on submerged trees or logs. In the event that the body is slid or shifted rearwards with respect to the rod, as the result of being struck at or contacted by a fish, the frame 10 moves rearwards with respect to the slide block 11, with the result that the hooks are caused to swing towards one another into their operative position wherein the hook parts 18 are disposed outside of the body and are hence capable of hooking into the jaws of the fish. Should a fish grasp within its jaws the rear portion of the body without causing the body to slide rearwards with respect to the rod, the shank parts 17 of the hooks, due to the fact that they are disposed for the most part exteriorly of the body, will be swung towards one another, thus causing the hook parts 18 to swing into their operative position. It is thus apparent that the hooks 9 are capable of hooking into the jaws of a fish, even though the fish, when striking the body, does not cause displacement or sliding of the body 7 with respect to the rod 8.

The herein described artificial fish bait consists of but a comparatively small number of parts and hence may be produced at a comparatively low cost. Due to the construction and design of the U-shaped frame 10 and the slide block 11 constituting the mechanism for automatically swinging the hooks into and out of their operative position in response to sliding movement of the body 7 relatively to the rod 8, the bait effectively and efficiently fulfills its intended purpose.

The invention is not to be understood as restricted to the details set forth since these may be modified within the scope of the appended claims without departing from the spirit and scope of the invention.

Having thus described my invention, what I claim as new and desire to secure by Letters Patent is:

1. As a new article of manufacture, a weedless variety artificial fish bait comprising an elongated body having a longitudinal slot in its central and rear portions and a longitudinal open ended bore extending through its front portion and leading to the front end of the slot, a rod extending slidably through the bore and into the front end of the slot and provided at its front end with means for attachment to a fish line, a frame disposed in the front end of the slot and embodying a pair of spaced apart rearwardly extending side pieces with transverse holes inwards of their rear ends, a slide block connected to the rear end of the rod and mounted between said side pieces so that it and the frame have relative sliding movement, a pair of oppositely disposed hooks extending lengthwise of the slot, consisting of forwardly disposed shank parts and rearwardly disposed hook parts, having the front ends of its shank parts extending inwards through the aforesaid holes and connected pivotally to the slide block, and adapted when the frame and body slide rearwards relatively to the slide block and rod to swing into an operative position wherein the hook parts thereof are disposed exteriorly of the body and when the frame and body slide forwards relatively to the slide block and rod to swing into an inoperative position wherein said hook parts are disposed within the rear end of the slot, and a spring arranged and positioned so that it serves to urge the frame and body forwards with respect to the slide block and rod and thus normally to maintain the hooks in their inoperative position.

2. As a new article of manufacture, a weedless variety artificial fish bait comprising an elongated body having a longitudinal slot in its central and rear portions and a longitudinal open ended bore extending through its front portion and leading to the front end of the slot, a rod extending slidably through the bore and into the front end of the slot and provided at its front end with means for attachment to a fish line, a U-shaped stamped metal frame disposed in the front end of the slot and embodying a crosspiece fitting against and interlocked with the portion of the body that defines the front end of the slot and in addition a pair of spaced apart side pieces connected to, and extending rearwards from, the ends of the crosspiece and provided inwards of their rear ends with transverse holes, a slide block connected to the rear end of the rod and mounted between said side pieces so that it and the frame have relative sliding movement, a pair of oppositely disposed hooks extending lengthwise of the slot, consisting of forwardly disposed shank parts and rearwardly disposed hook parts, having the front ends of its shank parts extending inwards through the aforesaid holes and connected pivotally to the slide block, and adapted when the frame and body slide rearwards relatively to the slide block and rod to swing into an operative position wherein the hook parts thereof are disposed exteriorly of the body and when the frame and body slide forwards relatively to the slide block and rod to swing into an inoperative position wherein said hook parts are disposed within the rear end of the slot, and a spring arranged and positioned so that it serves to urge the frame and body forwards with respect to the slide block and rod and thus normally to maintain the hooks in their inoperative position.

3. As a new article of manufacture, a weedless variety artificial fish bait comprising an elongated body having a longitudinal slot in its central and rear portions and a longitudinal open ended bore extending through its front portion and leading to the front end of the slot, a rod extending slidably through the bore and into the front end of the slot and provided at its front end with means for attachment to a fish line, a U-shaped frame disposed in the front end of the slot and embodying a crosspiece fitting against the portion of the body that defines the front end of the slot and in addition a pair of spaced apart side pieces connected to, and extending rearwards from the ends of the crosspiece and provided inwards of their rear ends with transverse holes, a slide block connected to the rear end of the rod and mounted between said side pieces so that it and the frame have relative sliding movement, a pair of oppositely disposed hooks extending lengthwise of the slot, consisting of forwardly disposed shank parts and rearwardly disposed hook parts, having the front ends of its shank parts extending inwards through the aforesaid holes and connected pivotally to the slide block, and adapted when the frame and body slide rearwards relatively to the slide block and rod to swing into an operative position wherein the hook parts thereof are disposed exteriorly of the body and when the frame and body slide forwardly relatively to the slide block and rod to swing into an inoperative position wherein said hook parts are disposed within the rear end of the slot, and a spiral compression spring extending around the rear end of the rod, having the front end thereof in abutment with the crosspiece on the frame and the rear end in abutment with the front end of the slide block and adapted to urge the frame and body forwards with respect to the slide block and rod and thus normally to maintain the hooks in their inoperative position.

4. As a new article of manufacture, a weedless variety artificial fish bait comprising an elongated body having a longitudinal slot in its central and rear portions and a longitudinal open ended bore extending through its front portion and leading to the front end of the slot, a rod extending slidably through the bore and into the front end of the slot and provided at its front end with means for attachment to a fish line, a U-shaped stamped metal frame disposed in the front end of the slot and embodying a crosspiece fitting against the portion of the body that defines the front end of the slot and in addition a pair of spaced apart parallel side pieces connected to, and extending rearwards from, the ends of the crosspiece, having the rear ends thereof bent to form inwardly extending bearing-forming sleeves, and provided directly forwards of the sleeves with transverse holes, a slide block connected to the rear end of the rod and mounted between said sleeves so that it and the frame have relative sliding movement, a pair of oppositely disposed hooks extending lengthwise of the slot, consisting of forwardly disposed shank parts and rearwardly disposed hook parts, having the front ends of its shank parts extending inwards through the aforesaid holes and connected pivotally to the slide block, and adapted when the frame and body slide rearwards relatively to the slide block and rod to swing into an operative position wherein the hook parts thereof are disposed exteriorly of the body and when the frame and body slide forwards relatively to the slide block and rod to swing into an inoperative position wherein said hook parts are disposed within the rear end of the slot, and a spring arranged and positioned so that it serves to urge the frame and body forwards with respect to the slide block and rod and thus normally to maintain the hooks in their inoperative position.

5. As a new article of manufacture, a weedless variety artificial bait comprising an elongated body having a longitudinal slot in its central and rear portions and a longitudinal open ended bore extending through its front portion and leading to the front end of the slot, a rod extending slidably through the bore and into the front end of the slot and provided at its front end with means for attachment to a fish line, a frame disposed in the front end of the slot and embodying a pair of spaced apart rearwardly extending side pieces with transverse holes inward of their rear ends, a slide block connected to the rear end of the rod, mounted between said side pieces so that it and the frame have relative sliding movement, provided with opposite recesses and transverse pins across the recesses, a pair of hooks extending lengthwise of the slot, consisting of forwardly disposed shank parts and rearwardly disposed hook parts, having the front ends of its shank parts extending inwards through the aforesaid holes and provided with eyes extending around and pivotally connected to the pins, and adapted when the frame and body slide rearwards relatively to the slide block and rod to swing into an operative position wherein the hook parts thereof are disposed exteriorly of the body and when the frame and body slide forwards relatively to the slide block and rod to swing into an inoperative position wherein said hook parts are disposed within the rear end of the slot, and a spring arranged and positioned so that it serves to urge the frame and body forwards with respect to the slide block and rod and thus normally to maintain the hooks in their inoperative position.

6. As a new article of manufacture, a weedless variety artificial bait comprising an elongated minnow-shaped body having a longitudinal slot in its central and rear portions and a longitudinal open ended bore extending through its front portion and leading to the front end of the slot, a rod extending slidably through the bore and into the front end of the slot and provided at its front end with means for attachment to a fish line, a U-shaped stamped metal frame disposed in the front end of the slot and embodying a crosspiece fitting against the portion of the body that defines the front end of the slot and in addition a pair of spaced apart side pieces connected to, and extending rearwards from, the ends of the crosspiece, having the rear ends thereof bent inwards to form bearing type sleeves, provided directly forwards of the sleeves with transverse holes, a slide block connected to the rear end of the rod, mounted between said sleeves so that it and the frame have relative sliding movement, and provided adjacent the frame side pieces with recesses and transverse pivot pins extending across the recesses, a pair of oppositely disposed hooks extending lengthwise of the slot, consisting of forwardly disposed shank parts and rearwardly disposed hook parts, having the front ends of shank parts extending through the aforesaid holes and provided with eyes extending around and pivotally connected to the pivot pins, and adapted when the frame and body slide rearwards relatively to the slide block and rod to swing into an operative position wherein the hook parts thereof are disposed exteriorly of the body and when the frame and body slide forwards relatively to the slide block and rod to swing into an inoperative position wherein said hook parts are disposed within the rear end of the slot, and a spiral compression spring extending around the rear end of the rod, having the front end thereof in abutment with the crosspiece of the frame and its rear end in abutment with the front end of the slide block, and adapted to urge the frame and body forwards with respect to the slide block and rod and thus normally to maintain the hooks in their inoperative position.

ALBERT H. SUHR.

REFERENCES CITED

The following references are of record in the file of this patent:

UNITED STATES PATENTS

| Number | Name | Date |
|---|---|---|
| 1,372,831 | Roderick | Mar. 29, 1921 |
| 1,479,652 | Cranstone | Jan. 1, 1924 |
| 1,557,644 | Andersen | Oct. 20, 1925 |
| 2,358,079 | Kridler | Sept. 12, 1944 |
| 2,431,181 | Maietta | Nov. 18, 1947 |
| 2,439,391 | Jobson | Apr. 13, 1948 |